US005430747A

United States Patent [19]
Jibbe et al.

[11] Patent Number: 5,430,747
[45] Date of Patent: Jul. 4, 1995

[54] BUS CONFIGURATION VALIDATION FOR A MULTIPLE SOURCE DISK ARRAY BUS

[75] Inventors: Mahmoud K. Jibbe; Craig C. McCombs, both of Wichita, Kans.

[73] Assignees: AT&T Global Information Solutions Company, Dayton, Ohio; Hyundai Electronics America, Milpitas, Calif.

[21] Appl. No.: 669,554

[22] Filed: Mar. 14, 1991

[51] Int. Cl.6 .................................. G06F 11/00
[52] U.S. Cl. ........................ 371/57.1; 371/29.5
[58] Field of Search ........... 395/575; 371/57.1, 20.1, 371/29.5; 364/240.1, 240.5

[56] References Cited

U.S. PATENT DOCUMENTS

| | | | |
|---|---|---|---|
| 4,918,696 | 4/1990 | Purdham et al. | 371/57.1 |
| 4,953,167 | 8/1990 | Byers et al. | 371/57.1 |

OTHER PUBLICATIONS

*Computer Architecture and Organization* by John P. Hayes ©1988, McGraw-Hill Inc. pp. 475–479.

*Primary Examiner*—Vincent P. Canney
*Attorney, Agent, or Firm*—James M. Stover

[57] ABSTRACT

An interrupt signal indicating the existence of a bus configuration error within a disk array system is generated by monitoring the enable signals controlling bus drivers included in the array system. The array configuration error detector includes bus configuration error detection logic for each multiple-source bus within the array. Each bus configuration error detector is connected to receive all enable signals for the bus drivers associated with one bus and decode the received enable signals to generate an error signal when more than one of the received enable signals is active. The error signals generated for each of the multiple-source busses are provided to an adder and combined to form the configuration error interrupt signal for the array.

8 Claims, 7 Drawing Sheets

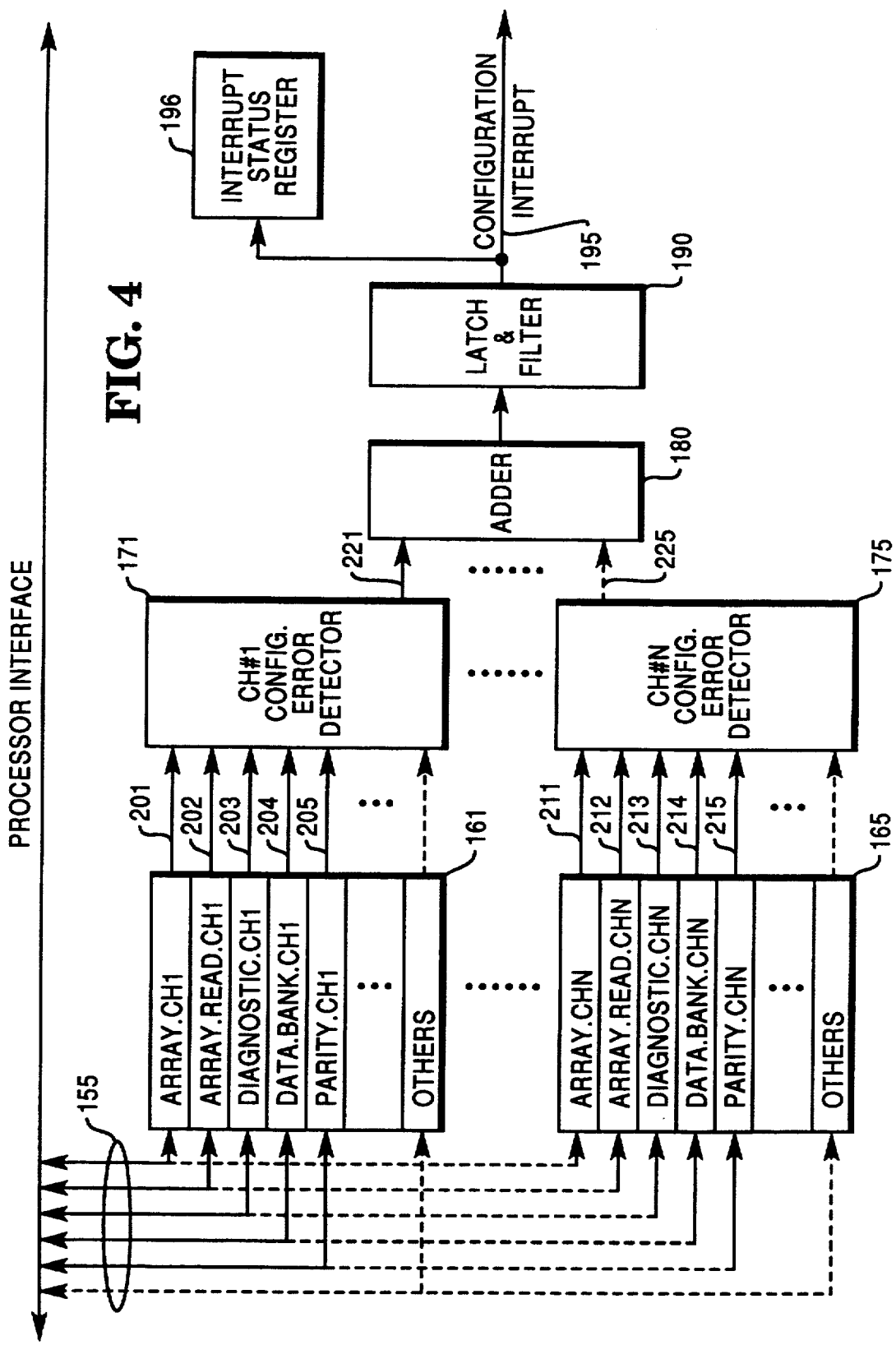

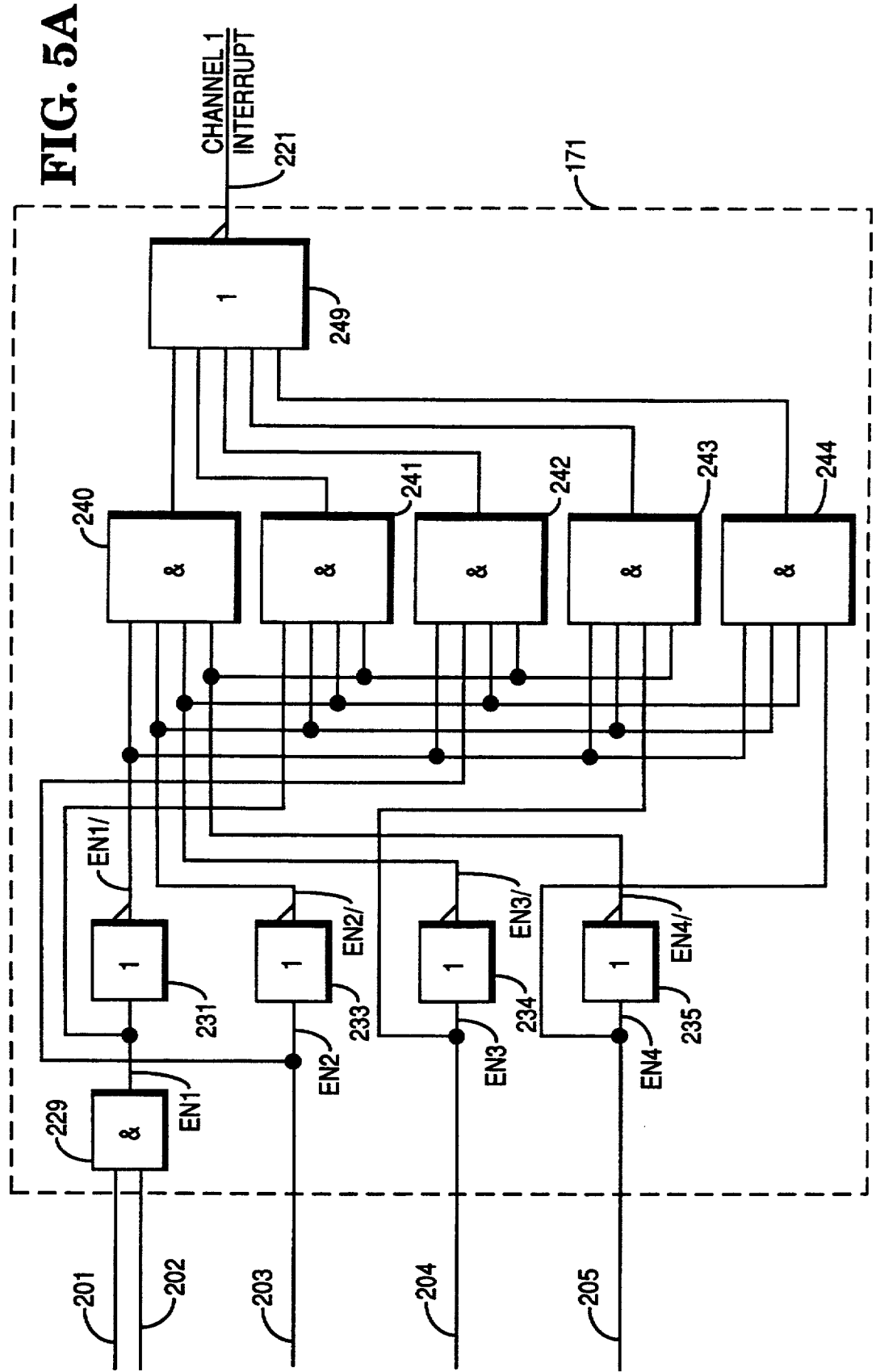

BUS CONFIGURATION VALIDATION FOR A MULTIPLE SOURCE DISK ARRAY BUS

The present invention relates to disk array storage devices for computer systems and, more particularly, to a bus configuration error detection system for a disk array.

BACKGROUND OF THE INVENTION

Recent and continuing increases in computer processing power and speed, in the speed and capacity of primary memory, and in the size and complexity of computer software has resulted in the need for faster operating, larger capacity secondary memory storage devices; magnetic disks forming the most common external or secondary memory storage means utilized in present day computer systems. Unfortunately, the rate of improvement in the performance of large magnetic disks has not kept pace with processor and main memory performance improvements. However, significant secondary memory storage performance and cost improvements may be obtained by the replacement of single large expensive disk drives with a multiplicity of small, inexpensive disk drives interconnected in a parallel array, which to the host appears as a single large fast disk.

Several disk array design alternatives were presented in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks.

An additional disk array arrangement, referred to as parity striping, is presented in an article titled "Parity Striping of Disc Arrays: Low-Cost Reliable Storage with Acceptable Throughput" by Jim Gray, Bob Horst and Mark Walker; Tandem Computers, Inc., Tandem Technical Report No. 90.2, January 1990, also incorporated herein by reference.

Disk array architectures necessarily include several data busses for transferring data between the host system and the individual disk drives within the disk array. Each of these data busses may be connected to receive data from one of several data sources such as the host system, one or more of the array disk drives, a parity generation circuit, temporary storage devices, or diagnostic data sources. However, only one source must be allowed to drive a multiple source bus at any instant, otherwise corrupted data will appear on the bus. Damage may also be inflicted upon one or more of the data sources should more than one source attempt to drive the bus. Means must therefore be provided to prevent the possibility that two or more source devices will attempt to drive an array bus contemporaneously, or to detect such a situation should it occur.

OBJECTS OF THE INVENTION

It is therefore an object of the present invention to provide a new and useful method and apparatus for detecting bus contention within a disk array.

It is another object of the present invention to provide a method and apparatus which validate disk array bus configurations before disk array data transfers are effected.

It is yet another object of the present invention to provide such a method and apparatus which validates disk array bus configurations by decoding control signals associated with array bus drivers.

It is a still further object of the present invention to provide a new and useful apparatus for detecting bus configuration errors within a disk array system which reduces software requirements within a health or configuration check process.

SUMMARY OF THE INVENTION

There is provided, in accordance with the present invention, apparatus which detects bus configuration errors within a disk array system and generates an interrupt signal informing the host system that a configuration error exists within the disk array. The apparatus includes a bus configuration error detector for each bus within the array that is driven by more than one source. Each bus configuration error detector monitors the enable signals for the bus drivers associated with the detector's corresponding array bus and generates a bus interrupt signal when more than one bus driver has been enabled to drive the bus. The bus interrupt signals produced by all the decoders are provided to an adder which combines the received signals to generate a single configuration interrupt signal for the array.

In the described embodiment, each bus configuration error detector comprises a decoder having a plurality of AND gates, each one of the AND gates being configured to decode a different, valid combination bus enable signals. The output signals of the AND gates are provided to a NOR gate to produce the bus interrupt signal. The described embodiment further includes a filter and latch for removing aberrant transitions from the array interrupt signal, synchronizing the array interrupt signal to the host system clock, timing the signal to be no less than one clock cycle and holding the signal until the configuration error has been cleared.

The above and other objects, features, and advantages of the present invention will become apparent from the following detailed specification when read in conjunction with the accompanying drawings in which applicable reference numerals have been carried forward.

BRIEF DESCRIPTION OF THE DRAWINGS

FIG. 4 is a functional block diagram of one configuration errors within the routing block shown in embodiment of the present invention for detecting bus FIG. 3.

FIG. 5A through 5C show a schematic diagram of a portion of the bus configuration error detection circuit shown in FIG. 4.

DETAILED DESCRIPTION OF THE PREFERRED EMBODIMENTS

Figure 1:
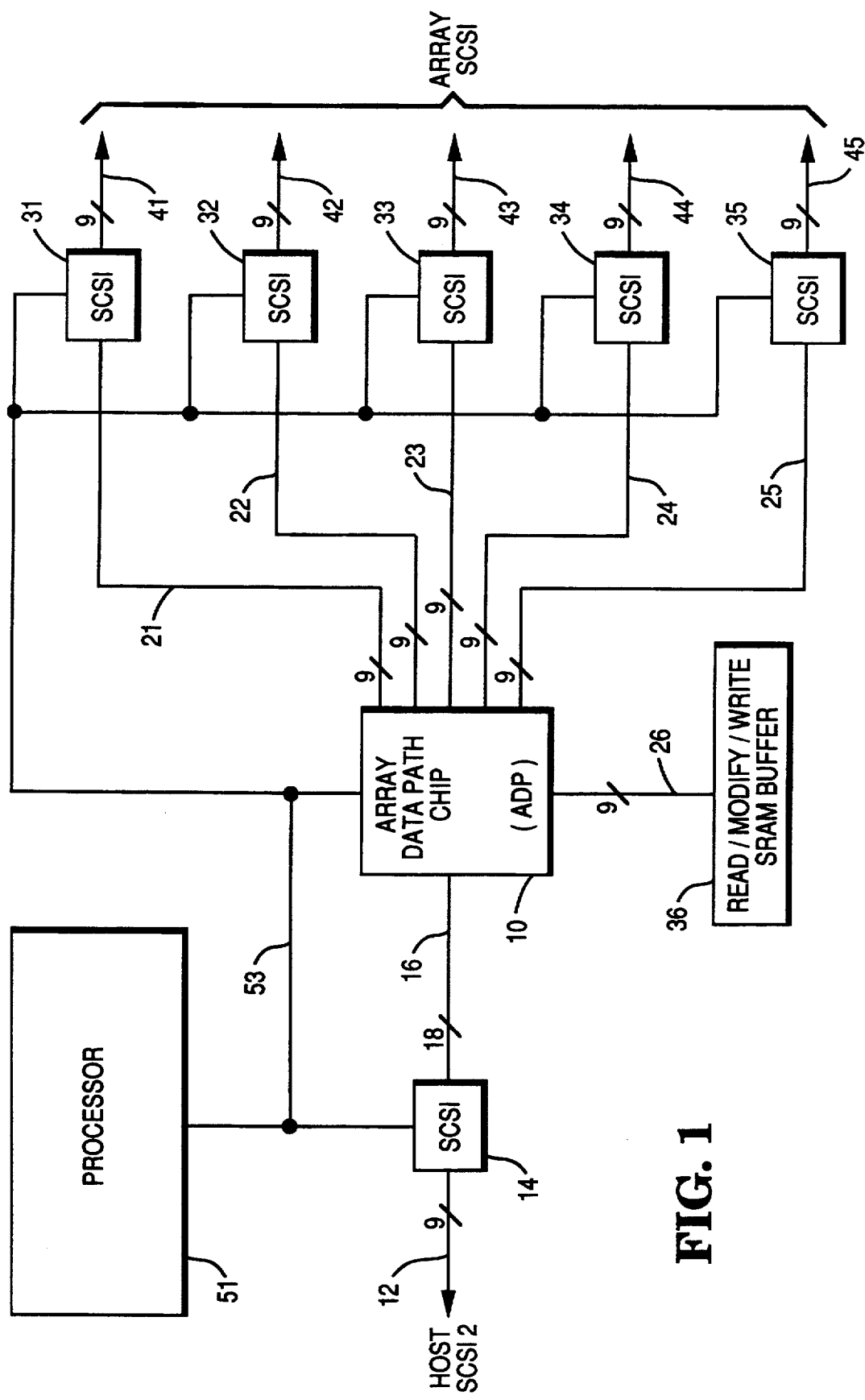
FIG. 1 is a block diagram of a disk array controller incorporating the interrupt generation architecture of the present invention.

Referring now to FIG. 1, there is seen a block diagram of a SCSI (small computer system interface) disk array controller incorporating the bus configuration error detector of the present invention. The controller includes a host SCSI adapter 14 to interface between the host system data bus 12 and SCSI data bus 16. Parity generation and data and parity routing are performed within Array Data Path Chip (ADP) 10. ADP chip 10 interconnects SCSI data bus 16 with six additional data busses, identified by reference numerals 21 through 26. SCSI bus interface chips 31 through 35 interface between respective SCSI data busses 21 through 25 and corresponding external disk drive data busses 41 through 45. Bus 26 connects ADP chip 10 with a 64 kilobyte static random access memory (SRAM) 36. ADP chip 10, SCSI adapter 14 and SCSI bus interface chips 31 through 35 all operate under the control of a dedicated microprocessor 51.

All data busses shown, with the exception of bus 16, include nine data lines, one of which is a data bus parity line. Bus 16 includes 16 data lines, two of which are bus parity lines. Additional control, acknowledge and message lines, not shown, are also included with the data busses.

SCSI adapter 14, SCSI bus interface chips 31 through 36, SRAM 36 and microprocessor 51 are commercially available items. For example, SCSI adapter 14 is a Fast SCSI 2 chip, SCSI bus interface chips 31 through 35 are NCR 53C96 chips and microprocessor 51 is a Motorola MC68020, 16 or 20 megahertz microprocessor. Also residing on the microprocessor bus are a one megabyte DRAM, a 128 kilobyte EPROM, an eight kilobyte EEPROM, a 68901 multifunction peripheral controller and various control and status registers.

Array data path chip 10 is an application specific integrated circuit device capable of handling all data routing, data multiplexing and demultiplexing, and parity generation and checking aspects of RAID levels 1, 3, 4 and 5. Data multiplexing of non-redundant data among five channels is also accommodated. ADP chip 10 handles the transfer of data between host SCSI adapter 14 and SCSI bus interface chips 31 through 35. The ADP chip also handles the movement of data to and from the 64 kilobyte SRAM during read/modify/write operations of RAID level 5.

Figure 2:
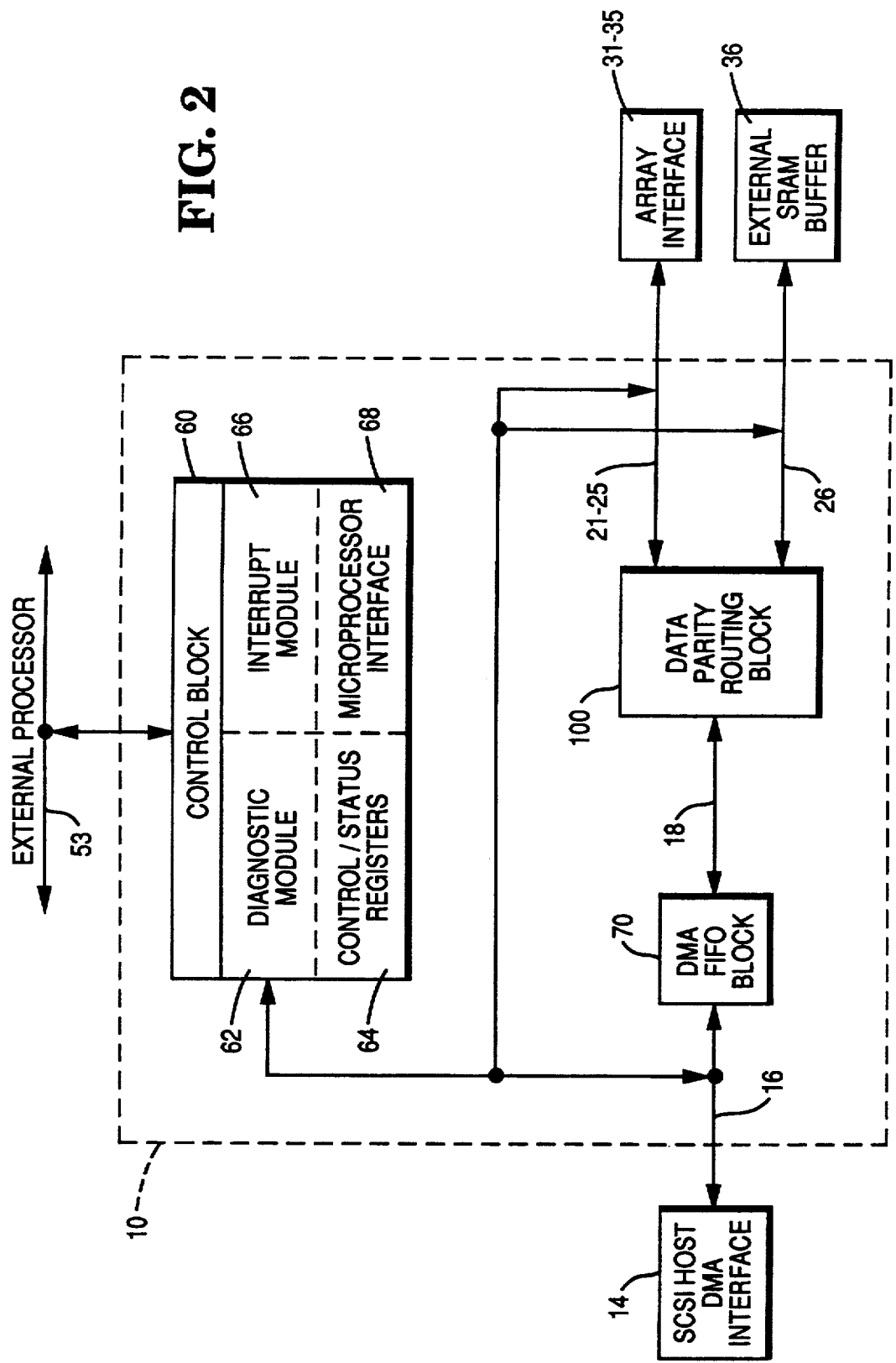
FIG. 2 is a functional block diagram of the Array Data Path Chip (ADP) shown in FIG. 1 which incorporates the interrupt generation architecture of the present invention.

FIG. 2 is a functional block diagram of the Array Data Path Chip (ADP) shown in FIG. 1. The ADP chip consists of the following internal functional blocks: control logic block 60 including diagnostic module 62, control and status register module 64, interrupt module 66 and interface module 68; DMA FIFO block 70; and data and parity routing block 100.

The main function of control block 60 is to configure and to test the data path and parity path described herein. Microprocessor interface module 68 contains basic microprocessor read and write cycle control logic providing communication and data transfer between microprocessor 51 (shown in FIG. 1) and control and status registers within the control block. This interface utilizes a multiplexed address and data bus standard wherein microprocessor read and write cycles consist of an address phase followed by a data phase. During the address phase a specific register is selected by the microprocessor. During the following data phase, data is written to or read from the addressed register.

Control and status register module 64 includes numerous eight-bit registers under the control of microprocessor interface module 68 as outlined above. The contents of the control registers determine the configuration of the data and parity paths. Status registers provide configuration and interrupt information to the microprocessor.

Diagnostic module 62 includes input and output data registers for the host and each array channel. The input registers are loaded by the processor and provide data to host bus 16, array busses 21 through 25 and SRAM bus 26 to emulate host or array transfers. The output registers, which are loaded with data routed through the various data buses, are read by the microprocessor to verify the proper operation of selected data and parity path configurations.

Interrupt module 66 contains the control logic necessary to implement masking and grouping of ADP chip and individual array channel interrupt signals, including the configuration error signal generated by the present invention. Any combination of the channel interrupt signals and internally generated ADP error interrupt signals can be combined together to generate interrupt signals for the microprocessor.

The function of DMA FIFO block 70 is to hold data received from the host until the array is ready to accept the data and to convert the data from eighteen bit bus 16 to nine bit busses 18. During read operations DMA FIFO block 70 holds the data received from the disk array until the host system is ready to accept the data and converts the data from nine bit busses 18 to eighteen bit bus 16.

Data and parity routing block 100 contains the steering logic for configuring the data and parity paths between the host, the disk array and SRAM 36 in response to control bytes placed into the control registers contained in module 64. Block 100 also includes logic for generating and checking parity, verifying data, broadcasting data, monitoring data transfers, and reconstructing data lost due to a single disk drive failure.

Figure 3:
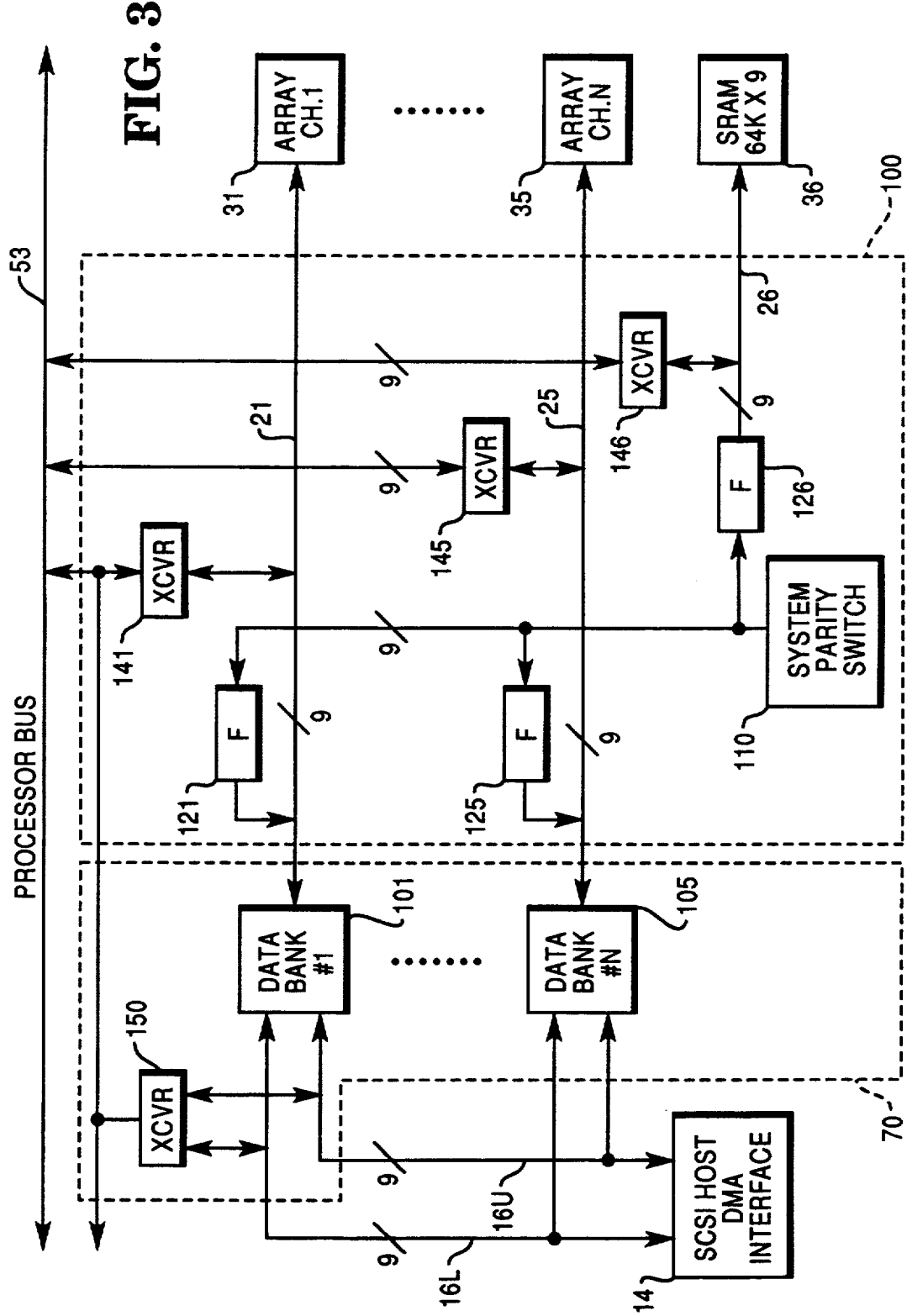
FIG. 3 is a functional block diagram of the routing block shown in FIG. 2. The array busses for a plurality of disk drives are shown, each bus being connected to a plurality of data sources.

FIG. 3 is a block diagram of DMA FIFO block 70 and routing block 100 shown in FIG. 2. The data routing architecture includes several data channels identified as channels one through N. Each one of channels one through N provides a data path between SCSI adapter 14 and a corresponding bus interface chip, two of which are identified by reference numerals 31 and 35.

The first data channel includes a data bank 101 connected between nine-bit data busses 16U and 16L and array bus 21. Data bank 101 holds data received from data busses 16U and 16L, or from controller processor bus 53 via transceiver 150, for placement unto array bus 21. Array bus 21 connects data bank 101 with bus interface chip 31, but also includes connections for receiving data from a system parity switch 110 and controller processor bus 53. The system parity switch connects to bus 21 through a tristate buffer 121. A transceiver 141 connects array bus 21 with processor bus 53. Thus, array bus 21 can be driven by four data sources: data bank 101, system parity switch 110 through tristate buffer 121, processor bus 53 through transceiver 141, and bus interface chip 31. Data bank 101, transceiver 141 and bus interface chip 31 can also operate to receive data from bus 21.

Array channels two through N are similar in construction to channel one. For example, channel N connects data busses 16U and 16L through a data bank 105 and an array bus 25 with bus interface chip 35. Array bus 25 also includes connections to system parity switch 110 and processor bus 53. Thus, each of array channel busses two through N can be driven by four data sources.

Also shown in FIG. 3 is a static random access memory (SRAM) 36 providing temporary storage of data received from parity switch 110 or other array elements. Bus 26 provides a data path between parity switch 110 processor bus 53 and SRAM 36. Three data sources are connected to drive SRAM bus 26: SRAM 36, parity switch 110 through tristate buffer 126, and processor bus 53 through transceiver 146.

Control lines, not shown, are provided between control registers residing in control and status module 64, discussed above, and data banks 101 through 105, tri-state buffers 121 through 126, transceivers 141 through 146 and 150, bus interface chips 31 through 35 and SRAM 36. Several control registers (not shown) included in configuration control and status register module 64 are responsible for configuration of the data paths, controlling the enablement of the various bus drivers, i.e. the data banks, tri-state buffers, transceivers, bus interface chips and SRAM 36.

The enable signals provided by the control registers and associated control logic to the various bus drivers are binary; the bus drivers being enabled in response to the receipt of a high state logic level signal and disabled when a low state signal is received. The bus configuration validation circuit shown in the functional block diagram of FIG. 4 monitors and decodes the states of the enable signals to determine that no more than one bus driver associated with each array bus is enabled at the same time. An interrupt signal is generated if two or more bus drivers are concurrently enabled on any single bus.

Referring now to the functional block diagram of FIG. 4, the bus configuration validation circuit is seen to include a register 161 and a configuration error detector circuit 171 associated with array channel one and a register 165 and a configuration error detector circuit 175 associated with array channel N. Corresponding registers and detector circuits, not shown, are also provided for the other array channels.

Each register is connected to control lines 155 to receive the bus driver enable signals associated with its corresponding array channel. For example, register 161 receives the following active high enable signals: (1) ARRAY.CH1, which, depending upon the state of signal ARRAY.READ.CH1, enables bus interface chip 31 to either read data from or write data to array bus 21; (2) ARRAY.READ.CH1, which enables bus interface chip 31 to write data to bus 21 when signal ARRAY.CH1 is also set high;(3) DIAGNOSTIC.CH1, which enables transceiver 141; (4) DATA.BANK.CH1, which enables data bank 101; and (5) PARITY.CH1, which enables tri-state buffer 121. Register N is similarly connected to receive the corresponding control signals associated with channel N.

The configuration error detector circuits for channel one (171) through channel N (175) are connected to receive the output signals from their corresponding registers and operate to combine the received signals to generate a configuration error interrupt signal for each channel, as will be discussed in greater detail with reference to FIGS. 5A and 5B. The N channel interrupt signals are combined by an adder 180 to produce the array configuration interrupt signal. Latch and filter circuitry 190 is included to remove false configuration errors generated when the array configuration is changed, to synchronize the configuration error signal to the system clock, and to hold any valid configuration interrupt signal until the detected error is corrected.

Figure 5B:
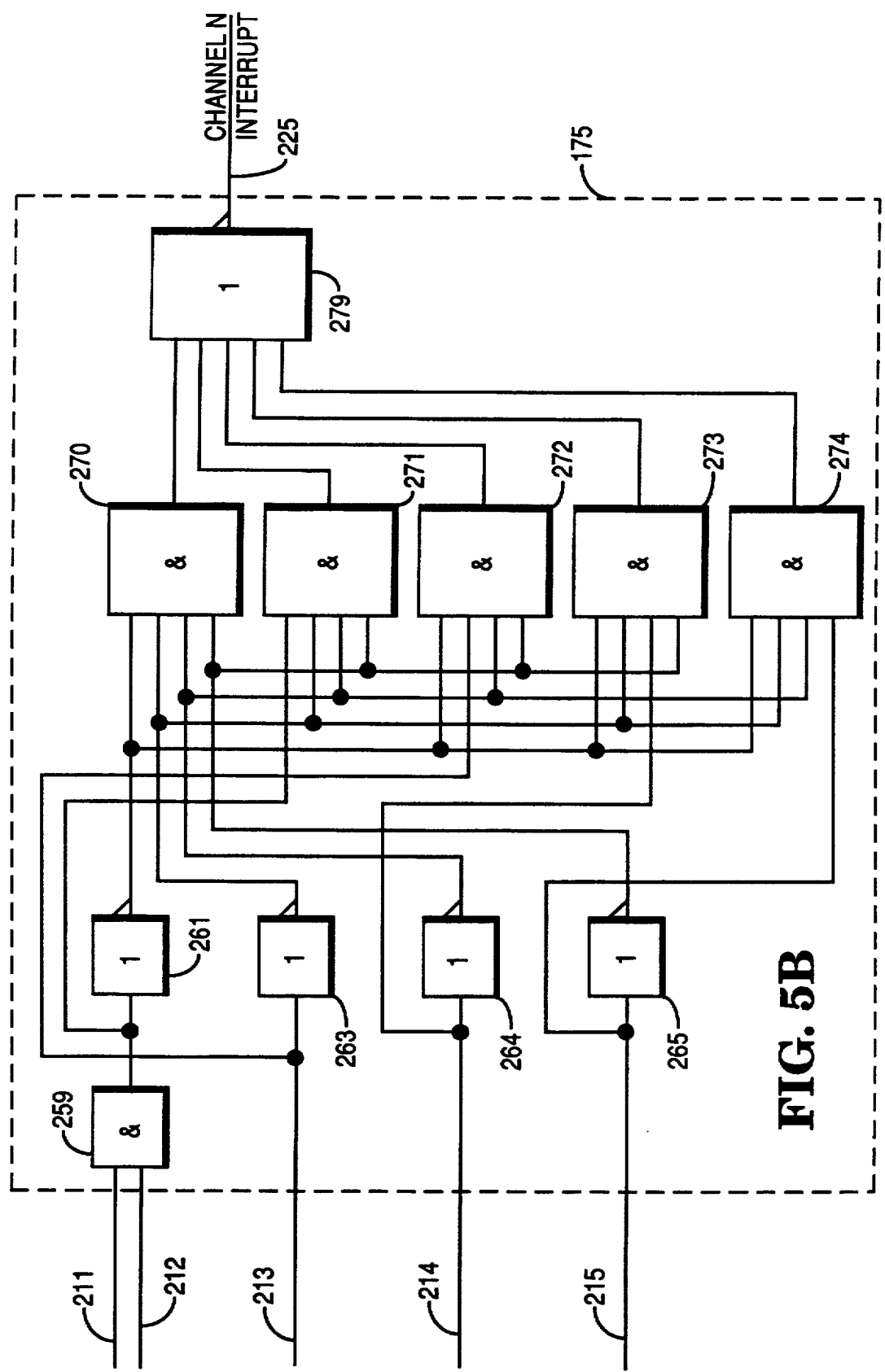

Schematic diagrams of the internal circuitry within configuration error detectors 171 and 175 are shown in FIGS. 5A and 5B, respectively. Referring to FIG. 5A, detector 171 includes an AND gate 229 connected by lines 201 and 202 to register 161 to receive enable signals ARRAY.CH1 and ARRAY.READ.CH1. The output of gate 229 is connected to the input of a first inverter 231. Three additional inverters, identified by reference numerals 233 through 235, are connected by lines 203 through 205 to register 161 to receive enable signals DIAGNOSTIC.CH1, DATA.BANK.CH1, and PARITY.CH1, respectively.

Detector 171 further includes five four-input AND gates identified with reference numerals 240 through 244. Gate 240 is connected to receive the outputs of inverters 231 and 233 through 235; gate 241 is connected to receive the output of AND gate 229 and the outputs of inverters 233 through 235; the inputs of gate 242 are connected to line 203 and the output terminals of inverters 231, 234 and 235; the inputs of gate 243 are connected to line 204 and the output terminals of inverters 231, 233 and 235; and AND gate 244 is connected to receive the signal on line 205 and the outputs of inverters 231, 233 and 234. The outputs of AND gates 240 through 244 are provided to a NOR gate 249 to produce the interrupt signal for array channel one.

The logic shown in FIG. 5A operates to combine the enable signals for the bus drivers associated with array bus 21 to generate a high state channel interrupt signal whenever more than one bus driver has been enabled. The table below shows the binary value of the channel one interrupt signal for the sixteen possible combination of bus driver enable signals for bus 21. The enable signals are designated EN1 through EN4, where EN1 is the Boolean product of signals ARRAY.CH1 and ARRAY.READ.CH1, EN2 corresponds to enable signal DIAGNOSTIC.CH1, EN3 corresponds to signal DATA.BANK.CH1, and EN4 is equivalent to signal PARITY.CH1.

TABLE 1

| EN4 | EN3 | EN2 | EN1 | CH1 Interrupt |
| --- | --- | --- | --- | --- |
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

The configuration error detectors associated with array channels two through N are identical in construction and operation to the channel one error decoder discussed above. The channel N error detectors (175) is shown in FIG. 5B. A similar error detector may be provided to generate a configuration error signal for SRAM bus 26. The detector circuit for the SRAM bus as shown in FIG. 3 may be simplified, however, since the SRAM bus includes only three bus drivers.

Figure 5C:
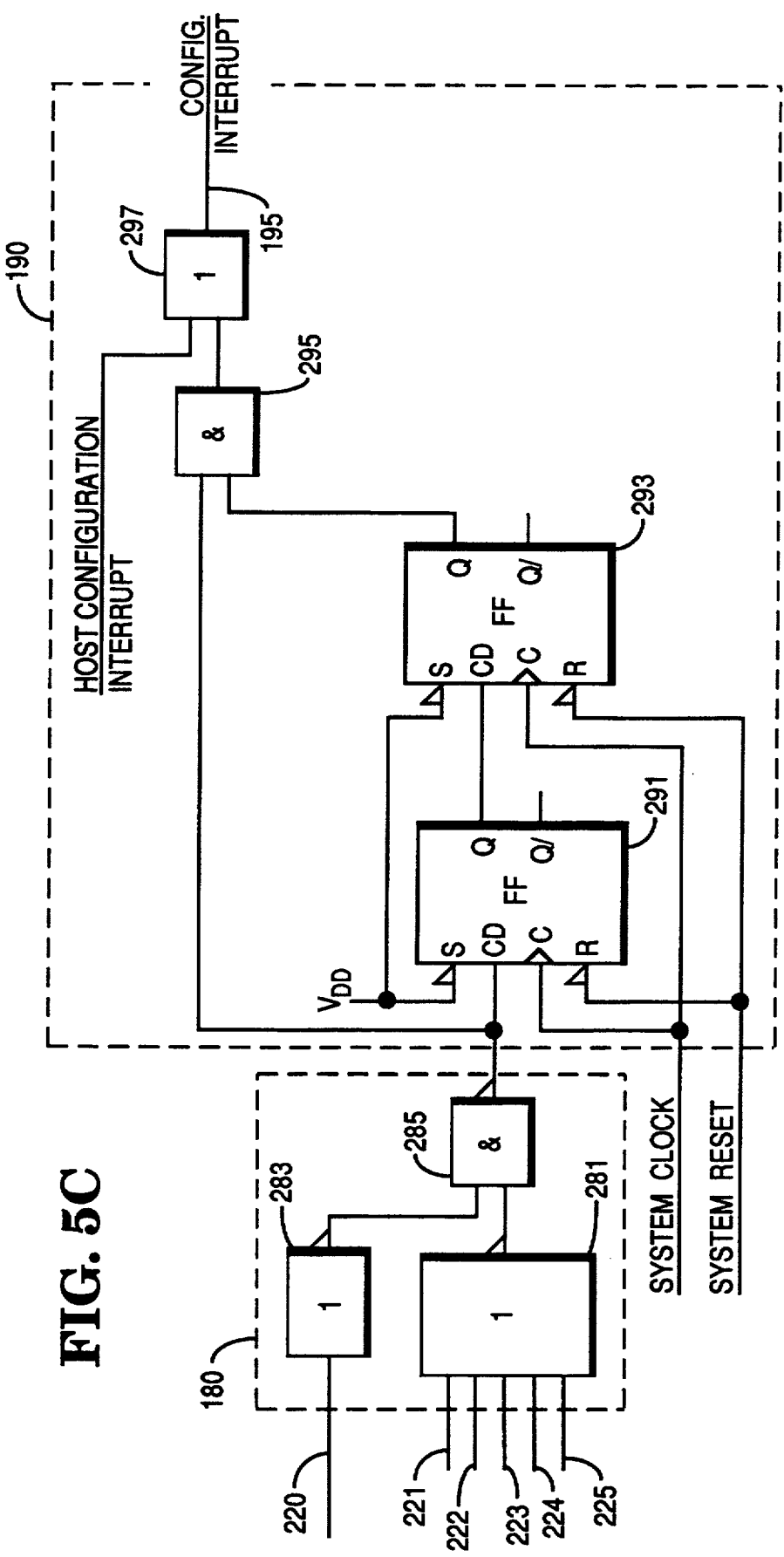

Adder 180, shown in FIG. 5C, includes a NOR gate 281 having a plurality of inputs 221 through 225 connected to receive the individual channel interrupt signals from the array channel error detectors. An inverter 283 is connected to receive the SRAM interrupt signal from line 220. A NAND gate 285 combines the outputs of NOR gate 281 and inverter 283 to produce the Boolean sum of the channel interrupt signals and the SRAM interrupt signal.

Filter and latch circuitry 190 includes two D-type flip-flops identified by reference numerals 631 and 633. Each of flip-flops 291 and 293 has its preset input (S) connected to a reference voltage VDD, its clear input (R) connected to receive a system reset signal, and its clock input (C) connected to receive the system clock signal. The output of adder 180 is provided to the data input of flip-flop 291 and the Q output of flip-flop 291 is connected to the data input of flip-flop 293. The Q output of flip-flop 293 is combined with the output of adder 180 by an AND gate 295 to produce the array configuration interrupt signal.

It can thus be seen that there has been provided by the present invention a simple method implemented in hardware for detecting bus contention within a disk array. The apparatus described above provides notification to the controller or system processor of an unallowed controller bus configuration. Erroneous data transfers and the corruption of data can thereby be prevented.

Those skilled in the art will recognize that the invention is not limited to the specific embodiments described above and that numerous modifications and changes are possible without departing from the scope of the present invention. For example, the architecture shown in FIGS. 4 through 5C and discussed in detail above may be readily expanded or contracted to accommodate any number of array channels and any number of bus drivers per channel.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for detecting bus configuration errors within a disk array system including a plurality of busses and a plurality of bus drivers associated with each one of said busses, the apparatus comprising:
a bus configuration error detector corresponding to each one of said array busses, each one of said detectors generating a bus interrupt signal for its corresponding array bus when more than one of the bus drivers associated with the corresponding array bus is in an enabled state; and
means connected to receive the bus configuration interrupt signals generated by each of said bus configuration error detectors for combining the interrupt signals to generate an array configuration interrupt signal, said array configuration interrupt signal indicating the detection of a configuration error in at least one of said array busses.

2. The apparatus according to claim 1, wherein:
each one of said bus drivers is enabled in response to an associated binary enable signal, each of said enable signals having a first state enabling its associated bus driver to provide data to its associated array bus and having a second state disabling its associated bus driver; and
each one of said bus configuration error detectors comprises decoding means connected to receive the enable signals for the bus drivers associated with the error detector's corresponding array bus.

3. The apparatus according to claim 2, wherein each one of said decoding means comprises:
an inverter associated with each enable signal received by the decoder;
an AND gate associated with each enable signal received by the decoder, each one of said AND gates being connected to receive its associated enable signal and the inverse of the remaining enable signals;
an AND gate connected to receive the output signals from each one of said inverters; and
a NOR gate connected to receive the output signals from each of said AND gates.

4. Apparatus for detecting bus configuration errors within a disk array system including a plurality of busses and a plurality of bus drivers associated with each one of said busses, each one of said bus drivers being enabled in response to an associated binary enable signal, the apparatus comprising:
a plurality of bus configuration error detectors, each of said detectors comprising decoding means connected to receive the the enable signals for each of the bus drivers associated with one of said plurality of array busses and responsive thereto to generate a bus interrupt signal, said bus interrupt signal having a first state when more than one of the received enable signals is at an enabling state and a second state otherwise; and
an adder connected to receive the bus configuration interrupt signals generated by each of said bus configuration error detectors for combining the interrupt signals to generate an array configuration interrupt signal, said array configuration interrupt signal having a first state when at least one of said bus interrupt signals is at its first state and a second state otherwise.

5. The apparatus according to claim 4, further comprising a filtering means connected to receive said array configuration interrupt signal for suppressing temporary signal transients in said array configuration interrupt signal.

6. A bus switch for connecting a host system with a plurality of disk drives, comprising:
a plurality of data busses;
a plurality of bus drivers associated with each one of said plurality of data busses, each one of said bus driver being enabled in response to an associated binary enable signal;
a bus configuration error detector corresponding to each one of said data busses and being connected to receive the enable signals for the bus drivers associated with its corresponding data bus, each one of said detectors generating a bus interrupt signal for its corresponding data bus, said bus interrupt signal having a first state when more than one of the received enable signals is at an enabling state and a second state otherwise; and
an adder connected to receive the bus configuration interrupt signals generated by each one of said bus configuration error detectors for combining the interrupt signals to generate an array configuration interrupt signal, said array configuration interrupt signal having a first state when at least one of said bus interrupt signals is at its first state and a second state otherwise.

7. The apparatus according to claim 6, further comprising:

a register corresponding to each one of said data busses and being connected to receive and hold the enable signals for the bus drivers associated with its corresponding data bus; and wherein:

each one of said bus configuration error detectors is connected to receive the enable signals stored in a corresponding one of said registers.

8. In a disk array system including a plurality of busses, each of said busses having a plurality of bus drivers, a method for detecting bus configuration errors comprising the steps of:

for each one of said plurality of array busses:
   determining the enablement state of each one of said plurality of bus drivers associated with said array bus;
   generating a bus configuration interrupt signal for said array bus when more than one of said plurality of bus drivers associated with said array bus is in an enabled state; and combining the bus configuration interrupt signals for each one of said plurality of array busses to generate an array configuration interrupt signal, said array configuration interrupt signal indicating the detection of a configuration error in at least one of said array busses.

* * * * *